Dec. 16, 1958 G. A. NEFF 2,864,948

DATA TRANSFER CONTROL CIRCUIT

Filed June 18, 1954 2 Sheets-Sheet 1

INVENTOR.
GLYN A. NEFF

BY James B. Christie

ATTORNEY

INVENTOR.
GLYN A. NEFF
BY James B. Christie
ATTORNEY

United States Patent Office 2,864,948

Patented Dec. 16, 1958

2,864,948

DATA TRANSFER CONTROL CIRCUIT

Glyn A. Neff, Pasadena, Calif., assignor, by mesne assignments, to Consolidated Electrodynamics Corporation, Pasadena, Calif., a corporation of California Application June 18, 1954, Serial No. 437,835

3 Claims. (Cl. 250—27)

This invention relates to control circuitry for data processing apparatus, and more particularly to control circuitry for providing a non-ambiguous transfer of information in data processing apparatus.

In data processing apparatus, it is frequently desirable to transfer information from a register or counter to another register or a storage device from time to time. When the information in the register or counter from which the information is derived is varying, the problem of achieving a non-ambiguous transfer or read-out of the registration at a selected time arises. For example, one type of register and counter which is employed frequently includes a plurality of bi-stable circuits, each of which is adapted to register a binary digit. The registration in the register or counter is changed by energizing selected ones of the bi-stable circuits so as to alter their condition from one stable condition of operation to another.

Although apparatus has been derived in which the time required to change the registration is relatively small, the transient period remains a finite time interval. If a read-out, i. e., transfer of information, is attempted during the change, the information transferred may be ambiguous in that it may not indicate the correct registration in the register or counter.

In accordance with my invention, a control circuit is provided in which signals are generated for initiating a transfer which cannot occur during the interval in which the registration in a register or counter is changing, i. e., when an ambiguous read-out might otherwise occur. In one embodiment of my invention, as employed in a system where clock pulses are applied to a counter and a read-out of the registration in the counter is made from time to time, the clock pulses are applied to a mono-stable circuit in such a way that the mono-stable circuit remains in its unstable condition for a period greater than the period required to achieve a change of registration in the counter.

When a signal is to be generated for initiating a transfer, a second mono-stable circuit is placed in its unstable condition and voltages derived from both the first mono-stable multivibrator and the second mono-stable multivibrator are applied to a comparison circuit. In turn, a voltage derived from the comparison circuit is differentiated and applied to a pulse generator, which generates a signal for initiating the transfer operation.

A better understanding of my invention may be had from a reading of the following detailed description when taken in connection with the drawings, in which.

Figures 1, 2:
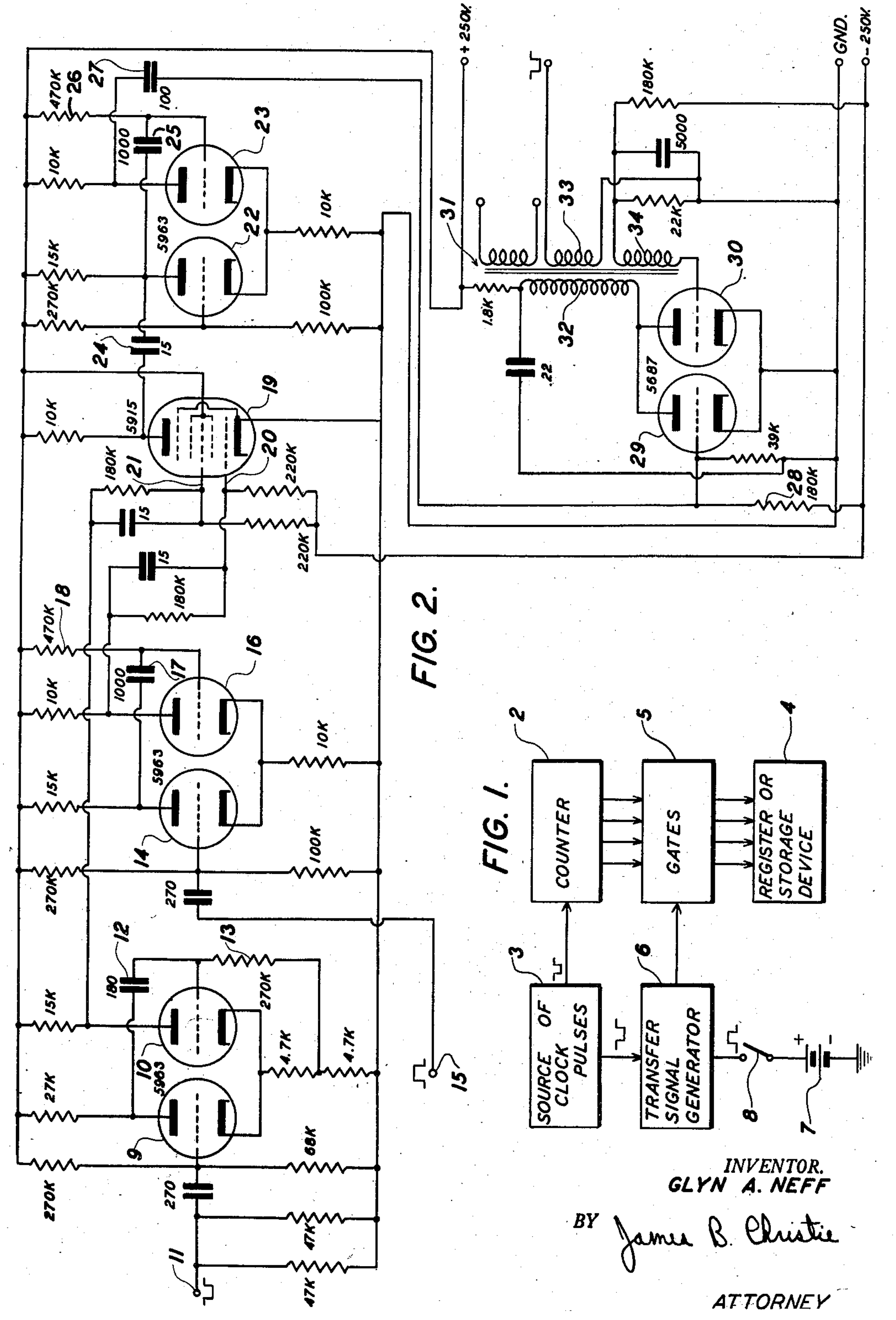
Fig. 1 is a block diagram illustrating one way in which the control circuitry of my invention may be employed.
Fig. 2 is a schematic circuit diagram of the transfer signal generator of Fig. 1.

The apparatus of Fig. 1 includes a counter 2 which is adapted to indicate elapsed time in terms of the number of clock pulses applied to the counter 2 from a source of clock pulses 3. The counter 2 may comprise any conventional type of counter, such as a binary counter including a plurality of interconnected bi-stable circuits. The registration in the counter 2 may be transferred to a register or storage device 4 by energizing the gates 5.

Where a registration is desired, the register 4 may include a plurality of bi-stable circuits, each of which corresponds to one of the bi-stable circuits of the counter 2. Where a more permanent form of storage of the registration appearing in the counter 2 is desired, the register or storage device 4 may include a magnetic recording system, or the like, adapted to store digital information.

In order to energize the gates 5 to pass information from the counter 2 to the register or storage device 4, I provide a transfer signal generator 6, which is adapted to energize the gates 5 only when the counter 2 is in a stable condition. By this means the gates 5 cannot pass an ambiguous registration derived during the transient condition in which the counter 2 is changing its registration.

Briefly, the transfer signal generator 6 receives negative going clock pulses from the source of clock pulses 3 and a positive going read-out signal which may be derived electronically or manually by applying intermittently a positive pulse from a battery 7 to the transfer signal generator 6 via a switch 8.

The transfer signal generator 6 functions to provide a gating signal to the gates 5 for initiating a transfer operation whenever a read-out signal is applied to the transfer signal generator 6. When the read-out signal is applied immediately succeeding the time when a clock pulse is applied to the transfer signal generator 6, the gating signal initiating the transfer operation is delayed for a suitable time to allow the counter 2 to achieve a stable registration. At other times a gating signal for initiating a transfer operation is provided immediately upon receipt of a read-out signal.

The apparatus of Fig. 2 may be employed as the transfer signal generator 6 of Fig. 1. The apparatus of Fig. 2 includes a first mono-stable circuit including a pair of electron tubes 9 and 10. When the circuit is in its stable condition the electron tube 9 is conducting while conduction in the electron tube 10 is cut off. Negative going pulses which indicate that the registration in a counter or register is being changed, such as the clock pulses from the source of clock pulses 3 of Fig. 1, may be applied to the control electrode of the electron tube 9 via a terminal 11.

The circuit is arranged so that a negative going pulse applied to the terminal 11 causes conduction in the electron tube 9 to be cut off and the electron tube 10 to be rendered conducting, and this condition prevails for a period depending in part upon the time constant of a capacitor 12 and a resistor 13. After the period of time in which the electron tube 10 is conducting has elapsed, the electron tube 9 will become conducting again, while conduction in the electron tube 10 will be cut off. The period of time in which the electron tube 10 is maintained conducting should be at least as long as the time required for the register or counter to change its registration and assume a stable condition.

When a read-out operation is to be performed, a positive going read-out pulse may be applied to the control electrode of an electron tube 14 via a terminal 15. The electron tube 14, and an associated electron tube 16, form a second mono-stable circuit in which the electron tube 16 is normally conducting while conduction in the electron tube 14 is normally cut off. When a positive pulse is applied to the control electrode of the electron tube 14, the circuit is arranged so that the electron tube 14 is rendered conducting and conduction in the electron tube 16 is cut off. The period of time for which the electron tube 14 remains conducting is determined in part by the time constant of a capacitor 17 and a resistor 18. I have found that for satisfactory operation the period for which the electron tube 14 is rendered conducting should be somewhat longer than the period for which the electron tube 10 of the first mono-stable circuit is rendered conducting.

Figure 3:
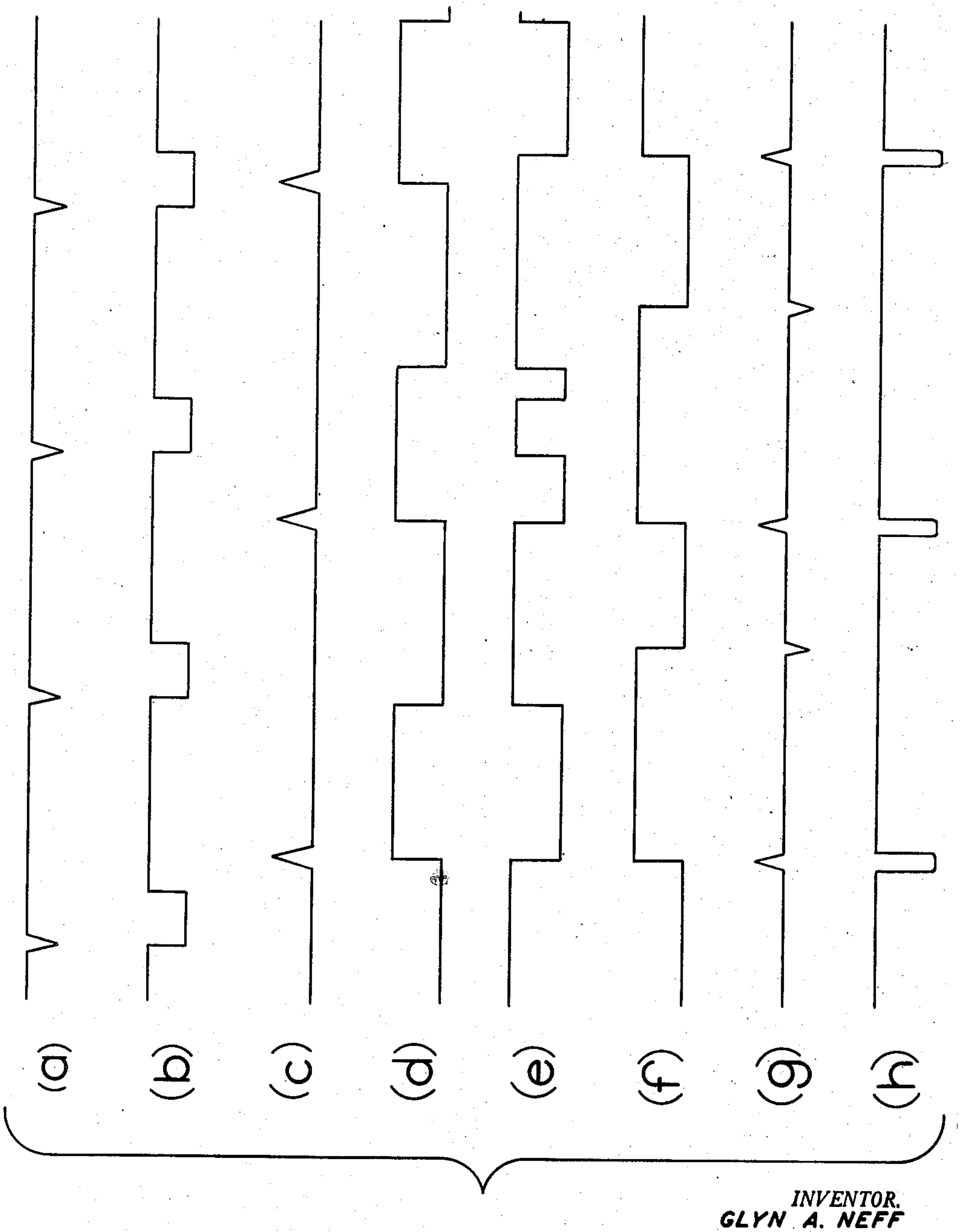
Fig. 3 is a set of graphical illustrations of certain wave forms appearing in the schematic circuit diagram of Fig. 2.

The signal applied to the terminal 11 is shown in Fig. 3(*a*) and the resulting voltage applied at the anode of the electron tube 10 is shown in Fig. 3(*b*). The signal applied to the terminal 15 is shown in Fig. 3(*c*) and the resulting voltage at the anode of the electron tube 16 is shown in Fig. 3(*d*). The voltage appearing at the anode of the electron tube 10 and the voltage appearing at the anode of the electron tube 16 are applied to a comparison circuit which may include an electron tube 19 having a plurality of control electrodes.

The voltage from the anode of the electron tube 16 is applied to a first control electrode 20 while the voltage appearing at the anode of the electron tube 10 is applied to another control electrode 21. The control electrode 20 is normally biased so that current flow in the electron tube 19 is cut off, and the control electrode 21 is normally maintained at the same potential as the cathode. This means that the voltage derived from the anode of the electron tube 10, when applied to the control electrode of the electron tube 19, will cause conduction in the electron tube 19 to be cut off during that period when the electron tube 10 is conducting, i. e., during that period immediately succeeding the time when a pulse is applied to the terminal 11.

On the other hand, the voltage derived from the anode of the electron tube 16 maintains the control electrode 20 at a potential which renders conduction in the electron tube 19 cut off, except during the period when the electron tube 16 is rendered non-conducting, i. e., during that period immediately after a pulse is applied to the terminal 15. Thus, the only time that current will flow in the electron tube 19 is when conduction in the electron tube 10 is cut off and conduction in the electron tube 16 is cut off. Therefore, the voltage at the anode of the electron tube 19 is as shown in Fig. 3(*e*); the voltage at the anode of the electron tube 10 is as shown in Fig. 3(*b*); and the voltage at the anode of the electron tube 16 is as shown in Fig. 3(*d*). The voltage appearing at the anode of the electron tube 19 may be applied to a third mono-stable circuit including the electron tubes 22 and 23 which is arranged so that the electron tube 23 is normally conducting, while conduction in the electron tube 22 is cut off.

When the voltage at the anode of the electron tube 19 rises, the positive excursion is coupled to the anode of the electron tube 22 via a capacitor 24. This causes the electron tube 22 to be rendered conducting, and conduction in the electron tube 23 to be cut off. The period for which the electron tube 22 remains conducting is determined in part by the time constant of a capacitor 25 and a resistor 26. I have found that for satisfactory operation the period for which the electron tube 22 is maintained conducting should be somewhat longer than the period for which the electron tube 14 of the second mono-stable circuit is rendered conducting.

The voltage appearing at the anode of the electron tube 23 is shown in Fig. 3(*f*). By applying this voltage to a differentiating circuit comprising a capacitor 27 and a resistor 28, the resulting wave form appearing across the resistor 28 is as shown in Fig. 3(*g*). The wave form of Fig. 3(*g*) may be applied to a buffer amplifier electron tube 29, which in turn energizes a pulse generator including an electron tube 30.

When a positive going pulse of the wave form of Fig. 3(*g*) is applied to the control electrode of the electron tube 29, the resultant drop in potential at the anode of the electron tube 29 is coupled to the control electrode of the electron tube 30 via the primary winding 32 and the secondary winding 34 of a transformer 31. This tends to render the electron tube 30 conducting, and the resultant drop in potential at the anode of the electron tube 30 is coupled to the control electrode of the electron tube 30 via the primary winding 32 and the secondary winding 34 of the transformer 31. This action is cumulative until the electron tube 30 reaches maximum conduction, at which time the electromagnetic field in the transformer 31 collapses and the control electrode of the electron tube 30 returns to a potential which causes conduction in the electron tube 30 to be cut off.

Thus, in response to a positive going pulse applied to the control electrode of the electron tube 29, a surge of current passes through the electron tube 30. Negative going pulses applied to the control electrode of the electron tube 29 have no effect. The surge of current passes through the primary winding 32 of the transformer 31, and by means of a secondary winding 33, a negative going gating signal is provided as shown in Fig. 3(*h*) which may be applied to the gates 5 of Fig. 1 for initiating a transfer operation.

As shown in Fig. 3, when one of the read-out signals of Fig. 3(*c*) occurs during an interval immediately succeeding one of the pulses of Fig. 3(*a*), as determined by the first mono-stable circuit which generates the wave form of Fig. 3(*b*), a gating signal is provided by the pulse generator lectron tube 30 at the conclusion of the interval. In contrast, when a read-out signal of Fig. 3(*c*) appears at other times, a gating signal is generated which is substantially coincident therewith.

The values of the components of the schematic circuit diagram of Fig. 2 are given by way of example only, and are indicative of those which were employed in one successful embodiment. The values of the resistors are given in ohms where $k=1000$, the values of the capacitors are given in micro-microfarads ($\mu\mu$fd.) where the number given is greater than one, and microfarads ($\mu$fd.) where the number given is less than one, and the values of the potentials are given in volts (v.).

Although the illustrative embodiment of the invention has been described in connection with apparatus for transferring the registration in a counter to a register or storage device, it will be appreciated that the invention may be employed wherever it is necessary to accomplish a non-ambiguous read-out from a source of information which may be in a transient condition at the time a transfer operation is to be performed.

I claim:

1. A control circuit for use in data processing apparatus, including in combination a first mono-stable circuit having a first condition of operation and a second condition of operation, means placing the first mono-stable circuit in its second condition of operation for a predetermined interval, a second mono-stable circuit having a first condition of operation and a second condition of operation, means placing the second mono-stable circuit in its second condition of operation for a predetermined interval longer than the predetermined interval of the first mono-stable circuit, a comparison circuit coupled to the first mono-stable circuit and the second mono-stable circuit, a third mono-stable circuit coupled to the comparison circuit and having a first condition of operation and a second condition of operation, means placing the third mono-stable circuit in its second condition of operation in response to a signal from the comparison circuit for a predetermined period longer than the predetermined period of the second mono-stable circuit, a differentiating circuit coupled to the third mono-stable circuit, and signal generating means coupled to the differentiating circuit.

2. A control circuit for use in data processing equipment, including in combination a first mono-stable circuit having a first condition of operation and adapted to assume a second condition of operation for a predetermined interval, a second mono-stable circuit having a first condition of operation and adapted to assume a second condition of operation for an interval longer than the predetermined interval of the first mono-stable circuit, a comparison circuit coupled to the first mono-stable circuit and the second mono-stable circuit, a third mono-stable circuit coupled to the comparison circuit having a first condition of operation and adapted to assume a second condition of operation in response to a signal from the comparison circuit, a differentiating circuit coupled to the third mono-stable circuit, and a signal generator coupled to the differentiating circuit for providing a signal when the third mono-stable circuit assumes its second condition of operation.

3. A control circuit, including in combination a first pulse generator for generating a pulse of a predetermined duration in response to each of a first set of signals, a second pulse generator for generating a pulse of a duration longer than the first predetermined duration in response to each of a second set of signals, a comparison circuit coupled to the first pulse generator and the second pulse generator, and an output signal generator coupled to said comparison circuit, said output signal generator being adapted to provide an output signal when one of the second set of signals is spaced between the pulses from the first pulse generator and an output signal at the conclusion of a pulse from the first pulse generator when a signal from the second set of signals coincides with one of the first pulses.

References Cited in the file of this patent

UNITED STATES PATENTS

| | | |
|---|---|---|
| 2,538,027 | Mozley et al. | Jan. 16, 1951 |
| 2,552,013 | Orpin | May 8, 1951 |
| 2,673,293 | Eckert et al. | Mar. 23, 1954 |